Patented Oct. 3, 1950

2,524,081

UNITED STATES PATENT OFFICE 2,524,081

PREPARATION OF THIURAM MONO-SULFIDES

Edmond J. Ritter, Wyandotte, Mich., assignor to Sharples Chemicals Inc., a corporation of Delaware No Drawing. Application April 13, 1948, Serial No. 20,829. In Canada July 26, 1947

17 Claims. (Cl. 260—293)

The present invention relates to an improved process for the manufacture of various thiuram monosulfides and particularly of tetra-alkyl thiuram monosulfides.

Said compounds have commonly been prepared by the reaction of a salt of the appropriate dithiocarbamic acid with either cyanogen chloride or phosgene. By either of these methods, however, an inferior product, almost black in color and containing substantial quantities of difficultly removable impurities, is obtained, except in the case of the tetramethyl thiuram monosulfide. Yields generally average about 40% and rarely exceed 60%.

The improved procedure of the present invention for the preparation, for example, of tetra-alkyl thiuram monosulfides involves the reacting in aqueous medium of a dialkyl thiocarbamyl chloride with a water-soluble salt of a dialkyl-dithiocarbamic acid. The reaction is illustrated by the following equation:

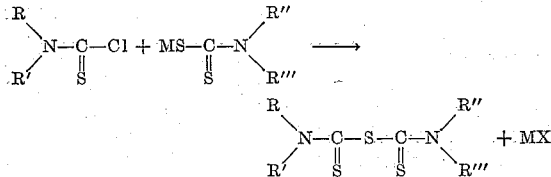

wherein R, R', R'' and R''' are alkyl radicals, straight and/or branch chain.

I have discovered that water is an outstandingly satisfactory medium in which to conduct the reaction, a fact which is surprising since the di-substituted thiocarbamyl chlorides are substantially water-insoluble, and are, therefore, caused to react in a heterogeneous system in which the rate of reaction would be expected to be too low for practicable purposes. Moreover, the di-substituted thiocarbamyl chlorides would be expected to decompose in water by analogy with other acid halides.

When thiocarbamyl chlorides and dithiocarbamates containing not more than five carbon atoms in each alkyl substituent are employed, yields averaging over 90% and often exceeding 95% of the desired thiuram monosulfide are readily obtained. Furthermore the products so obtained have good color and excellent stability and are especially suitable for use as accelerators in the vulcanization of rubber.

An additional advantage of the present process is that it is well suited to the preparation of relatively pure thiuram monosulfides of the general formula

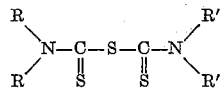

in which R and R' are different alkyl groups.

The formation of similar compounds by the treatment of a mixture of two different dialkyl-dithiocarbamates with phosgene is, of course, attended by the simultaneous formation of the symmetrical tetra-alkyl thiuram monosulfides.

The dialkyldithiocarbamates which may most usefully be employed in the practice of the present invention include the various water-soluble salts such as those of the alkali metals, ammonia and amines. The sodium salts are entirely satisfactory and have the advantage of relative cheapness. They are readily prepared from the corresponding secondary amines, carbon disulfide and aqueous base by methods well known to the art.

Examples of dialkyl dithiocarbamic acids which, in the form of their water-soluble salts, may be used in the practice of my invention, include those in which the alkyl substituents are the same, such as, the dimethyl, diethyl, dipropyl, dibutyl and diamyl dithiocarbamic acids; or in which the alkyl substituents are different, such as, the methyl-ethyl, methyl-propyl, methyl-butyl, methyl-amyl, ethyl-propyl, ethyl-butyl dithiocarbamic acids, etc. Examples of other disubstituted dithiocarbamic acids which, in the form of their water-soluble salts, may be used, include the phenyl-alkyl and cyclopolymethylene substituted acids, such as, the phenyl-methyl, phenyl-ethyl and cyclopentamethylene dithiocarbamic acids. In the phenyl-alkyl substituted acids the alkyl groups are preferably of from 1 to 5 carbon atoms.

Examples of dialkyl thiocarbamyl chlorides which may be used in the practice of my invention include those in which the alkyl substituents are the same, such as the dimethyl, diethyl, dipropyl, dibutyl and diamyl thiocarbamyl chlorides, or in which the alkyl substituents are different, such as the methyl-ethyl, methyl-propyl, methyl-butyl, methyl-amyl, ethyl-propyl, ethyl-butyl thiocarbamyl chlorides, etc. Examples of other disubstituted thiocarbamyl chlorides are the phenyl-alkyl and cyclopolymethylene thiocarbamyl chlorides, such as, the phenyl-methyl, phenyl-ethyl, and cyclopentamethylene thiocarbamyl chlorides. In the phenyl-alkyl thiocarbamyl chlorides the alkyl groups are preferably of from 1 to 5 carbon atoms.

Examples of water-soluble salts of disubstituted dithiocarbamic acids are the alkali metal salts, such as, the sodium and potassium salts; the alkaline earth salts, such as, the calcium, barium and magnesium salts; the disubstituted ammonium salts, (amine salts), and particularly those in which the two substituents on the nitrogen atom are the same, respectively, as those on the dithiocarbamic acid radical of the salt (including salts, such as, the piperidine salt), examples of which substituents have been given above; and the ammonium salts.

Of the foregoing salts of disubstituted dithiocarbamic acids the sodium salts are preferred.

While the dialkyl thiocarbamyl chlorides used in practice of the process of the present invention may be prepared by various methods, as by the reaction between thiophosgene and secondary amines, they are preferably prepared by the direct chlorination of tetra-alkyl thiuram di- and polysulfides by the process disclosed in my copending application Serial No. 645,233, filed February 2, 1946, which has matured into Patent No. 2,466,276, granted April 5, 1949. By employing the procedure of that application, the thiocarbamyl chlorides can be made directly from the corresponding tetra-alkyl thiuram disulfides, and the resulting thiocarbamyl chlorides can then be reacted with salts of dialkyldithiocarbamic acids to form the desired dialkyl thiuram monosulfides. The conversion of a tetra-alkyl thiuram disulfide into the corresponding dialkyl thiocarbamyl chloride is illustrated by the following equation:

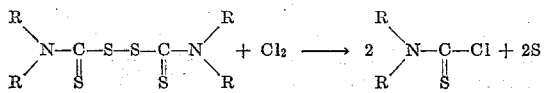

In a typical operation by which tetra-ethyl thiuram disulfide may be converted into the corresponding diethyl thiocarbamyl chloride, for example, the tetra-ethyl thiuram disulfide may be placed in a flask which is immersed in a hot water bath until the disulfide is melted. Chlorine gas may then be introduced beneath the surface of the melted thiuram sulfide product intermittently over a period of 15 minutes until half of the amount of chlorine necessary to effect the desired chlorination has been added. If the temperature at the beginning of the chlorination procedure is 75° C., this temperature may rise to 82° C., for example, during introduction of the chlorine. The flask may then be immersed in a water bath maintained at 40° C. and chlorination continued until the theoretically necessary quantity of chlorine has been added, the temperature being maintained between 50 and 60° C. during this continued chlorination. After the chlorination reaction has been completed, the reaction product is preferably maintained at a temperature between 50 and 70° C. for two hours or longer to permit sulfur and a trace of amine hydrochloride to precipitate. The product may then be filtered at a temperature of 52° C., and the filtrate distilled under vacuum to yield diethyl thiocarbamyl chloride of a high degree of purity.

While chlorination of various substituted thiuram sulfides such as represented by the above formula and equation may be accomplished by direct treatment of the liquid or melted thiuram sulfide, just as in the case of the tetra-ethyl thiuram disulfide discussed above, it will be desirable in many instances to suspend or dissolve the particular thiuram sulfide to be treated in a suitable solvent or diluent which is relatively inert under the conditions of the reaction. Thus, the thiuram sulfide may be suspended in carbon tetrachloride or dissolved in benzene or chloroform, and then subjected to chlorination by introduction of a stream of gaseous chlorine or other chlorinating agent providing free chlorine.

The chlorination reaction may be performed upon thioram di- and poly-sulfides of various degrees of sulfur content. Thiuram trisulfides or tetrasulfides may, for example, be chlorinated in the same manner as the corresponding disulfides, the differences in chlorination of these other sulfides being that, in the case of tri- and tetra-sulfides, a larger quantity of sulfur is liberated incident to formation of two molecules of thiocarbamyl chloride from a single molecule of the thiuram sulfide than is the case in chlorination of the disulfide. While the various thiuram sulfides may be chlorinated under the conditions discussed above in a manner closely analogous to that discussed by way of illustration with respect to chlorination of tetra-ethyl thiuram disulfide, it should be understood that a wide variety of conditions may be adopted in practice of the invention, with respect to chlorinating agent, conditions of the reaction and material to be chlorinated. The following examples illustrate chlorination of various thiuram sulfides in practice of the invention:

*Example 1*

402 grams (1.36 moles) of tetra-ethyl thiuram disulfide were dispersed in 800 ml. of carbon tetrachloride. 96.5 grams (1.36 moles) of chlorine gas were bubbled into the resulting suspension over a period of about 10 minutes, the temperature rising from 32° C. to 67° C. during this interval. By the time 49 grams of chlorine had been added, the remaining tetra-ethyl thiuram disulfide had become dissolved, with the result that a clear, reddish brown solution was formed. When 76 grams of chlorine had been added, the solution became cloudy due to formation of free sulfur. At the conclusion of the chlorination, sulfur was precipitated by cooling the reaction mixture on an ice bath. One-third of the solvent was then stripped off under vacuum and the solution was kept overnight at about 10° C. to precipitate further sulfur, which was removed by filtration. One-half of the remaining solvent was then stripped off and the residue was cooled on an ice bath and filtered. 200 grams of yellow crystals constituting crude diethyl thiocarbamyl chloride were obtained, having a melting point of 48–50° C. The filtrate resulting from the preceding operation was then stripped of solvent to give a second portion of product contaminated with sulfur. This crude product was remelted at 50° C., and the small quantity of sulfur precipitated in this remelting operation was removed. Upon solidification of the product, 202 grams of a light brown crystalline mass, M. P. 46.5–48.0° C. were obtained. This material was distilled at 113° C. at 10 mm. Hg pressure. Analysis showed 23.31% Cl, 8.89% N, 21.01% S, compared to theoretical values of 23.4% Cl, 9.24% N, and 21.1% S. The total yield was 402 grams or 98%.

*Example 2*

1118 grams (4.65 moles) of tetramethyl thiuram disulfide were dispersed in 3 liters of carbon tetrachloride. 330.5 grams (4.65 moles) of chlorine gas were bubbled into the resulting suspension during a period of three hours, the temperature rising from 25° C. to 65° C. during this chlorination. No external cooling was provided. The chlorination reaction resulted in formation of a relatively clear, deep orange solution. Toward the end of the reaction, the solution became milky, due to precipitation of sulfur. The flask containing the reaction product was immersed overnight in a water bath maintained at 10° C., and the product was decanted from the large mass of sulfur thus precipitated. The solvent was removed by vacuum distillation and the residue of this distillation was maintained at 50° C. for 30 minutes to precipitate a further small amount of sulfur. 1075 grams of crude dimethyl thiocarbamyl chloride (95.3% yield) were then decanted off. Upon purification, this material was found to have a M. P. of 42.5–43.5° C.

*Example 3*

296 grams (0.73 mole) of tetrabutyl thiuram disulfide were dissolved in 500 ml. of carbon tetrachloride. 52 grams (0.73 mole) of chlorine gas were bubbled into the resulting mixture over a period of 20 minutes. The temperature rose from 25° C. to 45° C. during introduction of the first 26 grams of chlorine, and the flask was then immersed in an ice bath and the reaction completed by introduction of the remaining 26 grams of chlorine to the reaction mixture maintained at about 30° C. Upon removal of free sulfur and solvent as in the preceding examples, a dark brown filtrate of crude dibutyl thiocarbamyl chloride weighing 260 grams (87% of theory) was obtained.

*Example 4*

152 grams (0.5 mole) of tetramethyl thiuram tetrasulfide were dispersed in 500 ml. of carbon tetrachloride. 35.5 grams (0.5 mole) of chlorine gas were bubbled in over a period of 20 minutes, with a resultant rise in temperature from 23° C. to 52° C. This example presented a contrast to the chlorination of tetraethyl thiuram disulfide, as in the preceding examples, in that a clear solution was not obtained at any time during the course of the reaction of the present example, due to splitting out of free sulfur. Solvent and sulfur were removed as in preceding examples, and the resulting dimethyl thiocarbamyl chloride weighed 58 grams (94% of theory), M. P. 41.5–43.0° C., as compared to a melting point of 42° C. assigned to this compound by Beilstein.

*Example 5*

192 grams (0.5 mole) of dipentamethylene thiuram tetrasulfide were dispersed in 700 ml. of carbon tetrachloride. 38 grams (0.53 mole) of chlorine gas were bubbled in over a 20 minute interval, and the temperature rose from 23° C. to 48° C. during this chlorination. A cloudy precipitate was present throughout the course of the reaction, due to splitting out of free sulfur. Upon purification as in preceding examples, 78 grams (95.3% of theory) of cyclopentamethylene thiocarbamyl chloride were obtained as an orange oil having a specific gravity at 20° C. of 1.250. The reaction of this example is represented by the following equation:

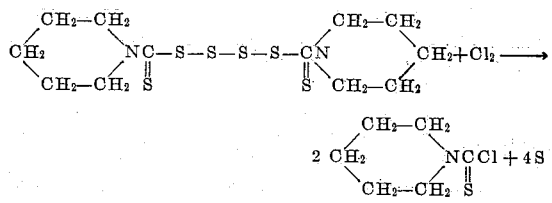

*Example 6*

Into a glass lined vessel was charged 276 pounds (0.931 lb. mole) of tetraethyl thiuram disulfide and 212 pounds of benzene. The resulting slurry, maintained between 50° and 60° C. and continuously agitated, was contacted with chlorine gas. 68 pounds (0.958 pound mole) of the latter were introduced through a partially submerged well-pipe over a period of 95 minutes. After cooling the mixture and separating the sulfur which deposited, 479 pounds of solution were obtained, containing 251 pounds (1.66 lb. mole) of diethyl thiocarbamyl chloride. This corresponded to a yield of 89.3%.

The preparation of the thiuram monosulfides of the present invention may be effected by mixing the thiocarbamyl chloride and the dithiocarbamate at temperatures sufficiently low to prevent the decomposition of the reactants or the product. In general best results are obtained when the temperature is maintained between the melting point of the thiocarbamyl chloride and 60° C. and when sufficient water is maintained in the reaction mixture at least to dissolve the dithiocarbamate. Somewhat higher or lower temperatures may, however, be used, the limits depending upon the particular alkyl substituents present.

Although the thiocarbamyl chloride may be reacted while in the solid phase, particularly when dispersed in fine particles, it is preferred to have it present in the reaction mixture in the liquid phase, among other things because it may be more highly dispersed in this form. To obtain the thiocarbamyl chloride in the liquid phase, the temperature of the reaction may be maintained above its melting point, which melting point will, of course, vary with the particular thiocarbamyl chloride employed. As an alternative, the melting point of the thiocarbamyl chloride may be depressed, such as by the addition to the reaction mixture of a small or minor amount of a solvent for the thiocarbamyl chloride, which solvent is preferably inert in the reaction mixture under the conditions obtaining. Examples of such solvents are carbon tetrachloride, ethylene dichloride, and aromatic hydrocarbons, such as benzene, toluene and xylene. Other solvents or diluents might be added, particularly if inert under the reaction conditions, if desired, for example, non-polar solvents, such as hydrocarbons, chlorocarbons and alkyl halides, of which the above-mentioned solvents are examples.

While any desired amount of such solvent may be employed, usually it does not represent more than 25% of the total mixture, and more particularly, not more than 10%. Smaller quantities may be employed with effect for the particular purpose stated.

Solvents such as the alcohols, if used, should be employed with caution because of their tendency to react with the thiocarbamyl chloride. Because of the presence of considerable quantities of water in my reaction, the lower alcohols, if used in minor amounts, would become so diluted with water as to substantially decrease their reactivity. This, however, would not be the case with the higher alcohols, which are sparingly soluble in water.

I recommend the use of temperatures below 100° C., and particularly below 75° C. The reaction is conveniently carried out at temperatures between 40 and 60° C., such as about 50° C. Preferably the temperature should not be so high as to tend to cause any of the reactants, such as the thiocarbamyl chloride, to decompose, and preferably should be sufficiently high so that the thiocarbamyl chloride is present in the liquid phase as pointed out above, although, as also pointed out above, lower temperatures may be employed, if desired for any reason.

The amount of water present in my reaction mixture is preferably at least sufficient to dissolve the dithiocarbamate. The solubility in water (at a given temperature, say at room temperature, or at the temperature of the reaction) of the water-soluble salts employed herein varies with the particular salt employed, as would be expected. Such aqueous solutions need not be saturated and may contain, for example, from 5% to 50% or more of water-soluble salt. Higher or lower quantities of water may be employed, if desired for any reason, without departing from the spirit of my invention. An essential of my reaction is that it take place in aqueous medium. Thus, water preferably is present to at least 25% by weight of the total final heterogeneous mixture, such as at least 50%, or even 75%, for example up to 90%. The advantages of employing an aqueous system are many-fold, whether the reaction is carried out in batch, or continuously, or otherwise.

The inorganic salt formed during the reaction may be readily removed by washing the crude product with water, and the product may then be dried by azeotropic distillation at a moderate temperature or by other procedures. Organic solvents are preferably volatilized at temperatures below the decomposition or darkening point of the product.

It is generally preferable to employ substantially equimolar quantities of the reactants, but other proportions may be used if desired. Any excess of the dithiocarbamate may be readily removed from the product along with the formed metal chloride by washing with water. Likewise any unreacted thiocarbamyl chloride may be removed by distillation in vacuo or by other suitable procedures.

The following examples will serve to illustrate the practice of my invention.

*Example 7*

To an aqueous solution containing 42.8 grams (0.25 mole) of sodium diethyldithiocarbamate was added 37.9 grams (0.25 mole) of diethylthiocarbamyl chloride. Mixing was carried out at room temperature; then the reaction mixture was warmed to 55° C. with stirring, the total reaction time being one hour. The opaque yellow oil which separated on cooling was removed and treated with 200 ml. benzene and drying was effected by stripping in vacuo on a hot water bath. The filtered product, tetraethyl thiuram monosulfide, was a clear, amber oil amounting to 63.5 grams (97% of theoretical yield). Analysis showed 9.83% N and 35.43% S as against calculated values of 10.6% N and 36.4% S.

*Example 8*

An aqueous solution which contained 49.8 grams (0.25 mole) of sodium di-n-propyldithiocarbamate was treated with 31.4 grams (0.175 mole) di-n-propylthiocarbamyl chloride in the same manner as for Example 7. The resulting tetrapropyl thiuram monosulfide was a light amber-colored oil weighing 51 grams (yield 91.1% of theory). The analysis showed 8.3% N and 28.79% S as against calculated values of 8.76% N and 30.0% S.

*Example 9*

The sodium di-n-butyldithiocarbamate was prepared by mixing 64.6 grams (0.5 mole) of di-n-butylamine with an aqueous solution of 20 grams sodium hydroxide in 540 grams of water, then adding dropwise into the stirred liquor 42 grams (0.55 mole) of carbon disulfide. The reaction was considered complete in one hour. 66 grams (0.32 mole) of di-n-butylthiocarbamyl chloride was added to the sodium di-n-butyldithiocarbamate solution and the procedure carried out as before. The product, a dark amber-colored oil, amounted to 117 grams. Analytical values were 6.85% N and 25.17% as against theretical values of 7.45% N and 25.5% S for tetrabutyl thiuram monosulfide.

*Example 10*

Diamylthiocarbamyl chloride, 34.6 grams (0.147 mole), was reacted with 66.2 grams (0.22 mole) of sodium di-amyldithiocarbamate, contained in an aqueous medium, by the procedure of Example 7. The yield of tetra-amyl thiuram monosulfide amounted to 62.8 grams (98.9% of theory). This reddish brown oil contained 5.9% N and 20.5% S by analysis as against calculated values of 6.49% N and 22.20% S.

*Example 11*

To an aqueous solution which contains 40.6 grams (0.25 mole) of ammonium diethyldithiocarbamate is added 37.9 grams (0.25 mole) of diethylthiocarbamyl chloride. The reaction is carried out as described in Example 7. The resulting tetra-ethyl thiuram monosulfide is obtained in about 95% yield.

*Example 12*

An aqueous solution which contains 37.7 grams (0.25 mole) of sodium dimethyldithiocarbamate is treated with 37.9 grams (0.25 mole) of diethylthiocarbamyl chloride in a manner substantially as described in Example 7. N,N-dimethyl, N′,N′-diethyl thiuram monosulfide is produced in about 90.6% yields.

*Example 13*

To an aqueous solution which contains 37.7 grams (0.25 mole) of sodium dimethyldithiocarbamate is added 30.8 grams (0.25 mole) of dimethylthiocarbamyl chloride and the reaction is carried out by the procedure of Example 7. Tetramethylthiuram monosulfide is produced in about 92% yield.

*Example 14*

Into a glass-lined vessel was charged 276 pounds (0.931 lb. mole) of tetraethyl thiuram disulfide and 212 pounds of benzene. The resulting slurry, maintained between 50° C. and 60° C. and continuously agitated, was contacted with chlorine gas. 68 pounds (0.958 lb. mole) of the latter was introduced through a partially submerged well-pipe over a period of 95 minutes. After cooling the mixture and separating the sulfur which deposited, 479 pounds of solution was obtained, containing 251 pounds (1.66 lb. moles) of diethylthiocarbamyl chloride. This corresponds to a yield of 89.3%.

A 98 pound portion of the benzene solution which contained 50.8% by weight of diethylthiocarbamyl chloride (0.390 lb. mole) was mixed with 282 pounds of 24% aqueous sodium diethyldithiocarbamate solution at room temperature in a 50 gallon stainless steel kettle. Over a one hour reaction period the temperature rose 20° C. Stirring was discontinued at the end of this period and the reaction mass was allowed to separate into two layers. The aqueous layer was drawn off leaving 145 pounds of an oil. The benzene was removed in vacuo and 93.9 pounds of tetraethyl thiuram monosulfide was obtained. This material which was an oil with sp. gr. 1.150 at 20° C. contained by analysis 10.1% N and 38.5% S. Upon standing for a week at 10° C. crystals formed which, when separated, had a melting range of 28-33° C.

While the invention has been more particularly described in terms of treatment of dialkylthiocarbamyl chlorides with salts of dialkyldithiocarbamic acids, it may be also applied in equivalent treatment of other thiocarbamyl chlorides with salts of other dithiocarbamic acids. The following example illustrates the practice of the invention in condensing the sodium salt of cyclopentamethylenedithiocarbamic acid (derived from piperidine and carbon disulfide) with cyclopentamethylene thiocarbamyl chloride.

*Example 15*

To an aqueous solution containing 91.5 grams (0.50 mole) of sodium cyclopentamethylene dithiocarbamate is added 81.7 grams (0.50 mole) of cyclopentamethylene thiocarbamyl chloride, and the reaction is carried out in a manner substantially as described in Example 7. Dicyclopentamethylene thiuram monosulfide is obtained in about 94% yield.

Various modifications are available within the scope of the invention and I do not, therefore, wish to be limited except by the scope of the following claims.

This application is a continuation-in-part of my co-pending application Serial No. 691,401, filed August 17, 1946, which has been forfeited and abandoned in favor of this application.

I claim:

1. A process for the production of tetra-alkyl thiuram monosulfide, comprising mixing at a temperature below 75° C. and below the decomposition point of any of the reactants and desired product present a dialkylthiocarbamyl chloride in liquid phase with an aqueous solution of a water-soluble salt of a dialkyldithiocarbamic acid to react said chloride and said salt to form tetra-alkyl thiuram monosulfide.

2. The process of claim 1 in which each alkyl group contains less than six carbon atoms.

3. The process of claim 2 in which the water-soluble salt is an alkali metal salt.

4. The process of claim 2 in which the water-soluble salt is a sodium salt.

5. In the manufacture of tetra-ethyl thiuram monosulfide, the process comprising contacting diethylthiocarbamyl chloride and an aqueous solution of a water-soluble salt of diethyldithiocarbamic acid.

6. In the manufacture of tetramethyl thiuram monosulfide, the process comprising contacting dimethylthiocarbamyl chloride and an aqueous solution of a water-soluble salt of dimethyldithiocarbamic acid.

7. In the manufacture of tetra-substituted thiuram monosulfide, the process comprising mixing at a temperature below 100° C. and below the decomposition point of any of the reactants and desired product present a compound chosen from the class consisting of dialkylthiocarbamyl chlorides, phenyl-alkyl thiocarbamyl chlorides and cyclopolymethylenethiocarbamyl chlorides with an aqueous solution of a water-soluble salt of a compound chosen from the class consisting of dialkyldithiocarbamic acids, phenyl-alkyl dithiocarbamic acids and cyclopolymethylene dithiocarbamic acids, to cause reaction therebetween to form the desired tetra-substituted thiuram monosulfide.

8. In the manufacture of tetra-substituted thiuram monosulfide, the process comprising mixing a compound chosen from the class consisting of dialkylthiocarbamyl chlorides, phenylalkyl thiocarbamyl chlorides and cyclopolymethylenethiocarbamyl chlorides with a water-soluble salt of a compound chosen from the class consisting of dialkyldithiocarbamic acids, phenylalkyl dithiocarbamic acids and cyclopolymethylene dithiocarbamic acids in an aqueous medium, to cause reaction therebetween to form the desired tetra-substituted thiuram monosulfide.

9. A process in accordance with claim 8 in which the reaction takes place at a temperature below 75° C., and in the presence of from 25% to 90% of water based on the final heterogeneous mixture.

10. A process in accordance with claim 9 in which a solvent for the thiocarbamyl chloride is present in minor amount, said solvent being substantially inert under the conditions obtaining in the reaction.

11. The process of claim 5 in which the water-soluble salt is the sodium salt.

12. A process for the production of tetra-substituted thiuram monosulfide, comprising mixing at a temperature below 75° C. and below the decomposition point of any of the reactants and desired product present a phenyl-alkylthiocarbamyl chloride in liquid phase with an aqueous solution of a water-soluble salt of a phenyl-alkyldithiocarbamic acid to react said chloride and said salt to form tetra-substituted thiuram monosulfide.

13. The process of claim 12 in which the water-soluble salt is an alkali metal salt.

14. The process of claim 12 in which the water-soluble salt is a sodium salt.

15. A process for the production of tetra-substituted thiuram monosulfide, comprising mixing at a temperature below 75° C. and below the decomposition point of any of the reactants and desired product present cyclopentamethylene thiocarbamyl chloride in liquid phase with an aqueous solution of a water-soluble salt of cyclopentamethylene dithiocarbamic acid to react said chloride and said salt to form tetra-substituted thiuram monosulfide.

16. The process of claim 15 in which the water-soluble salt is an alkali metal salt.

17. The process of claim 15 in which the water-soluble salt is a sodium salt.

EDMOND J. RITTER.

REFERENCES CITED

The following references are of record in the file of this patent:

UNITED STATES PATENTS

| Number | Name | Date |
| --- | --- | --- |
| 2,139,935 | Claudin | Dec. 13, 1938 |

OTHER REFERENCES

Braun, "Ber. deut. chem.," vol. 36 (1903), pages 2276, 2277 and 2281 to 2283.